(12) United States Patent
Guasta et al.

(10) Patent No.: US 8,870,195 B2
(45) Date of Patent: Oct. 28, 2014

(54) COMPUTER CART

(71) Applicant: Bretford Manufacturing, Inc., Franklin Park, IL (US)

(72) Inventors: Jack Guasta, Glendale Heights, IL (US); Morad Ghassemian, Oak Park, IL (US)

(73) Assignee: Bretford Manufacturing, Inc., Franklin Park, IL (US)

( * ) Notice: Subject to any disclaimer, the term of this patent is extended or adjusted under 35 U.S.C. 154(b) by 0 days.

(21) Appl. No.: 14/188,386

(22) Filed: Feb. 24, 2014

(65) Prior Publication Data

US 2014/0191729 A1    Jul. 10, 2014

Related U.S. Application Data

(63) Continuation of application No. 13/472,797, filed on May 16, 2012, now Pat. No. 8,657,312.

(60) Provisional application No. 61/595,427, filed on Feb. 6, 2012.

(51) Int. Cl.
*B62B 1/00* (2006.01)
*A47B 83/00* (2006.01)
*G06F 1/16* (2006.01)
*H02J 7/00* (2006.01)
*B62B 5/00* (2006.01)
*B62B 3/00* (2006.01)

(52) U.S. Cl.
CPC ................. *H02J 7/0027* (2013.01); *B62B 5/00* (2013.01); *H02J 7/00* (2013.01); *B62B 3/005* (2013.01); *B62B 2202/56* (2013.01)
USPC ............. 280/79.2; 312/223.2; 361/679.5; 280/37

(58) Field of Classification Search
USPC ............. 312/223.2, 322.3, 322.6; 280/79.11, 280/79.2, 47.26, 47.35, 37, 47.29
See application file for complete search history.

(56) References Cited

U.S. PATENT DOCUMENTS

| | | | | |
|---|---|---|---|---|
| 5,889,648 | A * | 3/1999 | Heavirland et al. | 361/600 |
| 7,160,113 | B2 * | 1/2007 | McConnell et al. | 434/365 |
| 7,595,995 | B2 * | 9/2009 | Hock | 361/727 |
| 7,800,914 | B2 * | 9/2010 | Dully | 361/756 |
| 8,320,110 | B2 * | 11/2012 | Chen | 361/679.02 |
| 2005/0115437 | A1 * | 6/2005 | Jennings, III | 102/206 |
| 2009/0109615 | A1 * | 4/2009 | Potter et al. | 361/679.55 |

\* cited by examiner

*Primary Examiner* — John Walters
*Assistant Examiner* — James Triggs
(74) *Attorney, Agent, or Firm* — Anderson Gorecki & Rouille LLP

(57) ABSTRACT

A computer cart has removable electrical connector management system which may be removed from the computer cart to install portable electronic device electrical transformers, and then reinserted into the computer cart to enable multiple electrical transformers to be installed into the cart as a group. An electrical charging system uses a staggered round robin approach to control distribution of power within the computer cart without requiring the amount of power used from each power strip to be individually monitored.

16 Claims, 8 Drawing Sheets

COMPUTER CART

CROSS-REFERENCE TO RELATED APPLICATIONS

This application is a continuation of U.S. patent application Ser. No. 13/472,797, filed May 16, 2012, which claims priority to U.S. Provisional Patent Application No. 61/595,427, filed Feb. 6, 2012, the content of each of which is hereby incorporated herein by reference.

BACKGROUND OF THE INVENTION

1. Field of the Invention

The present invention relates to storage systems and, more particularly, to a cart designed to house and store portable computing devices.

2. Description of the Related Art

Portable computing devices, such as laptop and tablet computers, are commonly used in educational facilities to enrich the curriculum provided to students. Likewise, these types of devices are increasingly being used in other contexts, such as in museums, to enable people to interact with the exhibits present in the museum.

Portable computing devices typically include a battery that may be charged to enable the portable computing devices to be used while not connected to an electrical outlet. Since most batteries are charged using relatively low voltage DC power (e.g. 19.5 volt or 24 volt), a transformer is commonly used to convert 120/240 volt 60/50 Hz AC electrical power available in a standard electrical outlet to the lower voltage DC power required by the device. Transformers of this type used to convert line power for use by laptop computers have commonly become known as "bricks". Generally, bricks are computer specific, in that each type/model of computer may have its own transformer depending on the particular power characteristics of that specific computer.

Computer carts have been developed which may be used to store portable computing devices in a secure manner. Often, the portable computing devices will be electrically connected within the cart to enable the portable computing devices to be charged and synchronized while stored in the cart. Because the computer bricks are required to interconnect the computers to an electrical power source, the cart must also be designed to accommodate the computer bricks. Where the cart is designed to hold multiple portable computing devices such as 24-36 computers, installation of the computer bricks and associated power cords, as well as storage of the bricks and power cords within the computer cart, may present challenges. Likewise, when changing between computer types or upgrading computers, it may be necessary to remove all the wiring and associated bricks from the cart and reinstall the new bricks and associated power cords, which can take a considerable amount of time. Accordingly, it would be advantageous to provide a new type of computer cart with improved transformer and power cord storage, installation, and maintenance capabilities.

SUMMARY OF THE INVENTION

The following Summary and the Abstract set forth at the end of this application are provided herein to introduce some concepts discussed in the Detailed Description below. The Summary and Abstract sections are not comprehensive and are not intended to delineate the scope of protectable subject matter which is set forth by the claims presented below.

A computer cart has removable electrical connector management system which may be removed from the computer cart to install portable electronic device electrical transformers, and then reinserted into the computer cart to enable multiple electrical transformers to be installed into the cart as a group. An electrical charging system uses a staggered round robin approach to control distribution of power within the computer cart without requiring the amount of power used from each power strip to be individually monitored.

BRIEF DESCRIPTION OF THE DRAWINGS

Aspects of the present invention are illustrated by way of example in the following drawings in which like references indicate similar elements. The following drawings disclose various embodiments of the present invention for purposes of illustration only and are not intended to limit the scope of the invention. For purposes of clarity, not every component may be labeled in every figure. In the figures.

DETAILED DESCRIPTION

Figure 1:
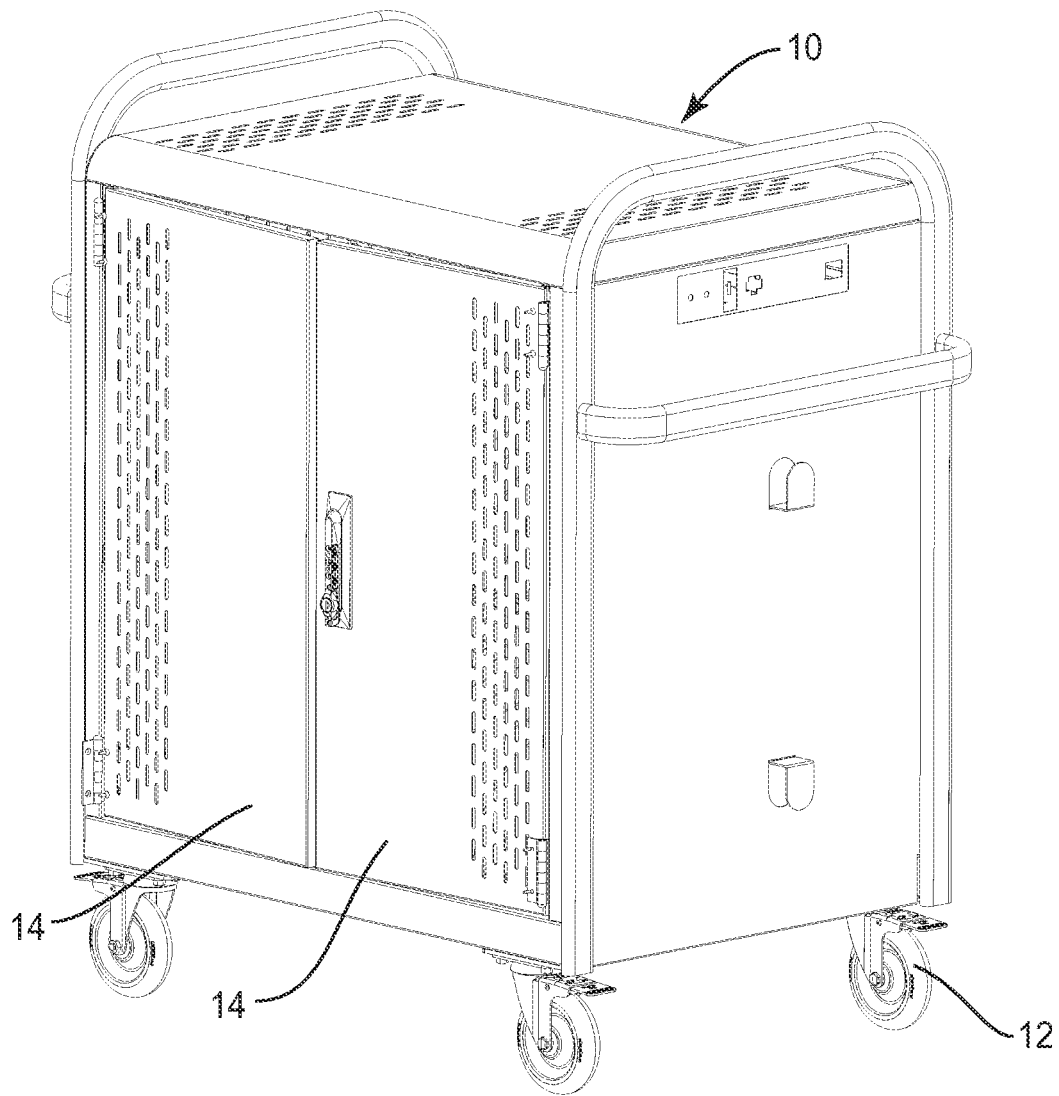
FIG. 1 is a front perspective view of a computer cart according to an embodiment.

FIG. 1 shows a perspective view of one embodiment of a computer cart 10 designed to maintain a large number of portable computing devices such as laptop computers and tablet computers. In the view of FIG. 1, the doors of the computer cart are closed to show how the cart appears when closed for storage. The exterior of the cart may be of arbitrary design and the invention is not limited to a cart having the particular aesthetic appearance of the cart shown in FIG. 1.

In general, the computer cart shown in FIG. 1 has an exterior sheathing which may be vented as appropriate to enable heat generated by charging computers to be released from the cart. Depending on the particular configuration of the ventilation system, the ventilation system may be passive or active. The exterior of the cart generally protects the computers from being accessed while being stored within the cart. The cart also has wheels 12 to enable the cart to be mobile. The wheels may be implemented as castors which may be directionally locking and/or motion locking depending on the particular embodiment. Doors 14 on the front of the cart allow access to an interior computer storage area where the portable computing devices are stored in the cart. The doors may be locked to prevent unauthorized access to the computers stored therein. The front compartment where computers are stored will be referred to herein as the computer storage area. A compartment in the rear of the computer cart, which also is accessible via a similar set of doors, will be referred to herein as a cord management storage area.

Figure 2:
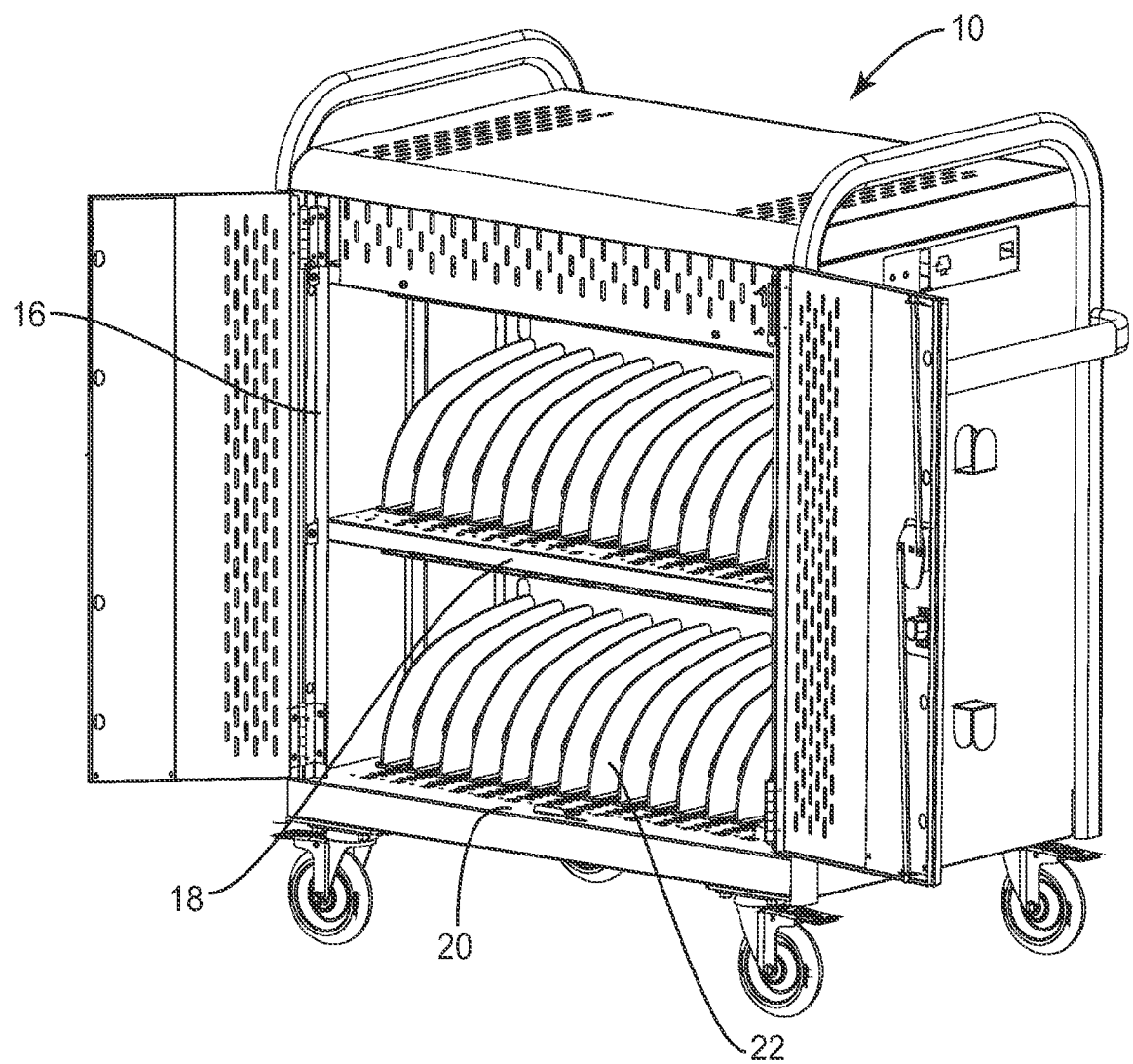
FIG. 2 is a front perspective view of the computer cart of FIG. 1 with the doors opened to show a computer storage compartment of the computer cart.

FIG. 2 shows the cart of FIG. 1 with the doors 14 opened to reveal the interior of the cart. In the embodiment shown in FIG. 2, the computer cart 10 generally is formed as a cabinet having an interior framing structure 16 which is used to support one or more shelves 18. The exterior sheathing of the computer cart is also attached to the interior framing structure 16. A floor 20 forms a bottom of the computer cart 10. Dividers 22 are provided to separate the computer storage area into individual computer storage compartments sized to hold the computers. In the embodiment shown in FIG. 2, the computer cart is sized to hold 30 computers. Other numbers of compartments may be included as well.

Each individual computer storage compartment is defined by a pair of dividers which physically separate the compartment from an adjacent storage compartment so that the computers are able to be held vertically within the cart. Each computer storage compartment is designed to hold a single portable computer. In the embodiment shown in FIG. 2, the individual computer storage compartments are included within the cart on multiple shelves which enable two rows of portable computing devices to be stored within the computer cart. In other embodiments the compartments may be arranged in different ways to enable other numbers of computers to be stored within the cart.

Figure 3:
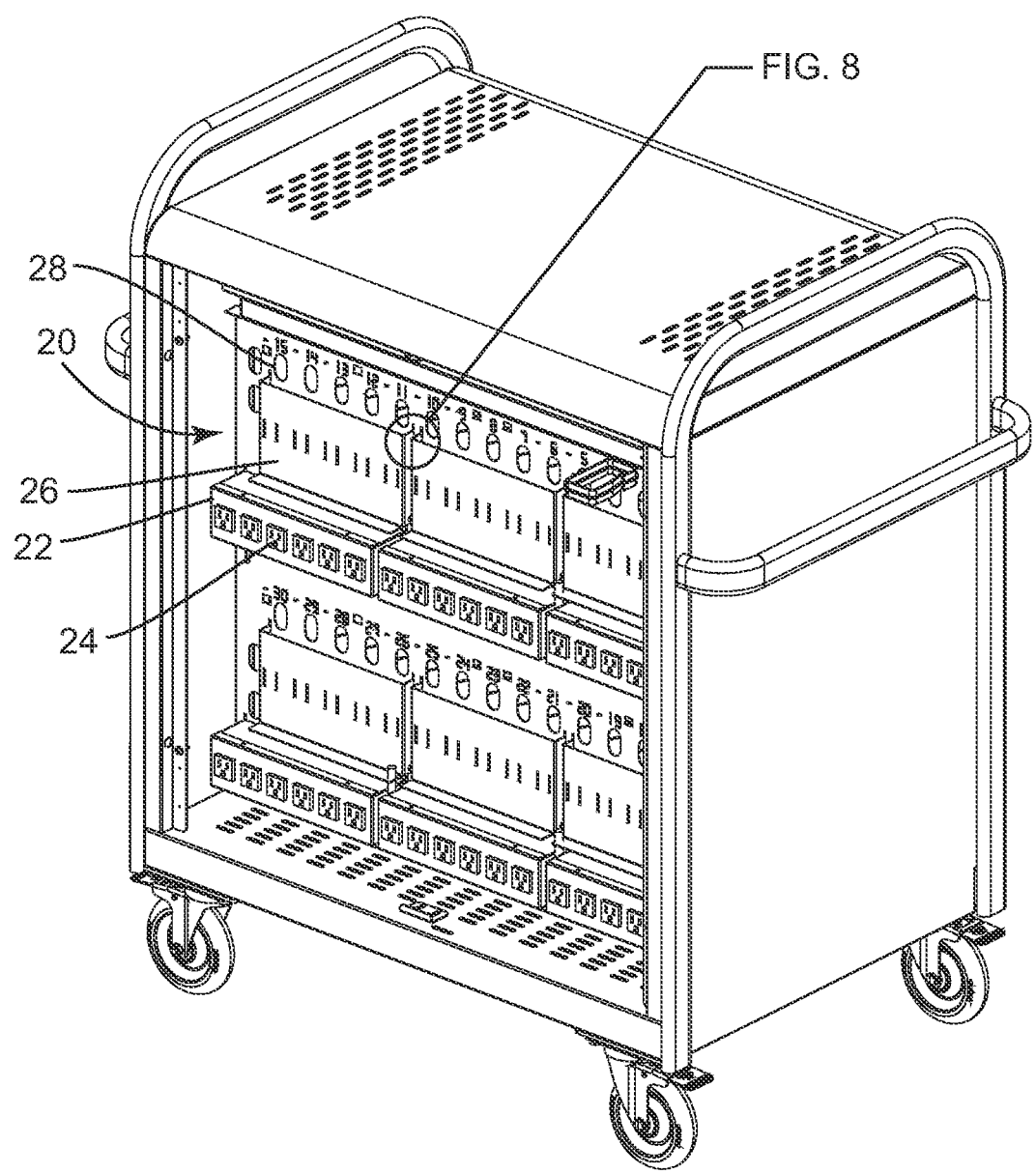
FIG. 3 is a rear perspective view of the computer cart of FIG. 1 with the doors removed to show a cord management compartment of the computer cart.

FIG. 3 shows a rear cord management storage area 20 designed to store transformers and associated power cords for the computers stored in the computer cart. In the view shown in FIG. 3 the doors have been removed to allow the interior of the cord management storage area to be visible. Doors similar to the doors 14 shown in FIG. 1 may be included to allow access to the cord management storage area to be restricted, so that the transformers are not unintentionally or intentionally unplugged and/or removed from the cart. In another embodiment, a fixed back panel may be screwed onto the computer cart to restrict access to the interior of the cord management storage area.

As shown in FIG. 3, the cord management compartment includes power strips 22, each of which includes six individual power outlets 24. Each power strip corresponds to a charging zone as described in greater detail below. Although the power strips are shown as having 6 outlets, since each power strip in the illustrated embodiment is designed to provide power to a zone of five computer storage compartments, in another embodiment a different number of outlets may be incorporated in each power strip 22.

A removable electrical transformer attachment panel 26 is provided for each zone to hold electrical transformers for computers stored in associated compartments of the cart. Apertures 28 allow power cords to be passed from the rear cord management area to a respective computer storage compartment in the computer storage area. To facilitate corresponding a transformer with a computer stored in a particular computer storage compartment, the apertures 28 are numbered. The individual computer storage compartments are likewise numbered with corresponding numbers so that a computer storage compartment may be uniquely identified with a corresponding brick storage location in the rear cord management area.

Figure 4:
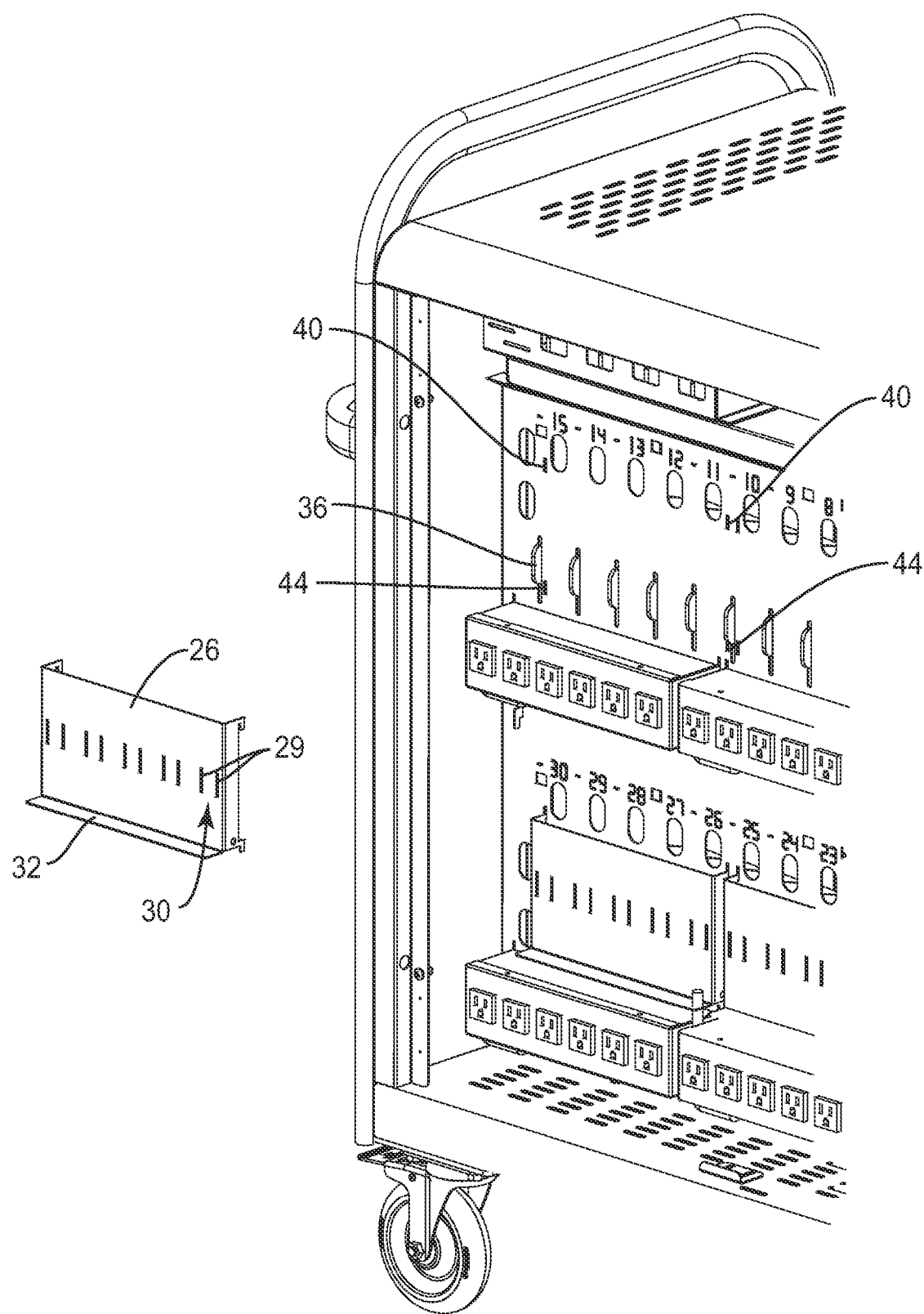
FIG. 4 is an expanded view of the structure shown in FIG. 3 showing a removable electrical transformer attachment panel.

To enable electrical transformers to be installed in the cart, in one embodiment, the electrical transformer attachment panels are removable, as shown in FIG. 4. In operation, when transformers are to be inserted into the cart, the electrical transformer attachment panel may be removed as shown in FIG. 4. Electrical transformers may then be attached to the transformer attachment panel, such as by using plastic cable ties, and the transformer attachment panel and associated transformers and power cords may be re-inserted into the cart as a unit. Other ways of attaching the transformers to the transformer attachment panel may be used as well, such as zip ties, wire ties, Velcro straps, nylon or plastic ties, wire ties such as twist ties or stainless steel ties, and elastic straps. Slots 29 are provided to enable the ties to pass through the electrical transformer attachment panel. In one embodiment, as shown in FIG. 4, pairs of slots 29 define electrical transformer attachment areas 30 designed to individually hold electrical transformers.

A shelf 32 is provided on a lower edge of the electrical transformer attachment panel 26. The shelf 32 prevents the electrical transformers from extending beyond a lower edge of the electrical transformer attachment panel so that, when the electrical transformer attachment panel is reinserted into the cart, the electrical transformers do not impinge on the power strips 22. This facilitates insertion of the electrical transformer attachment panels back into the rear cord management area by ensuring proper positioning of the transformers on the electrical transformer attachment panel.

Figure 5:
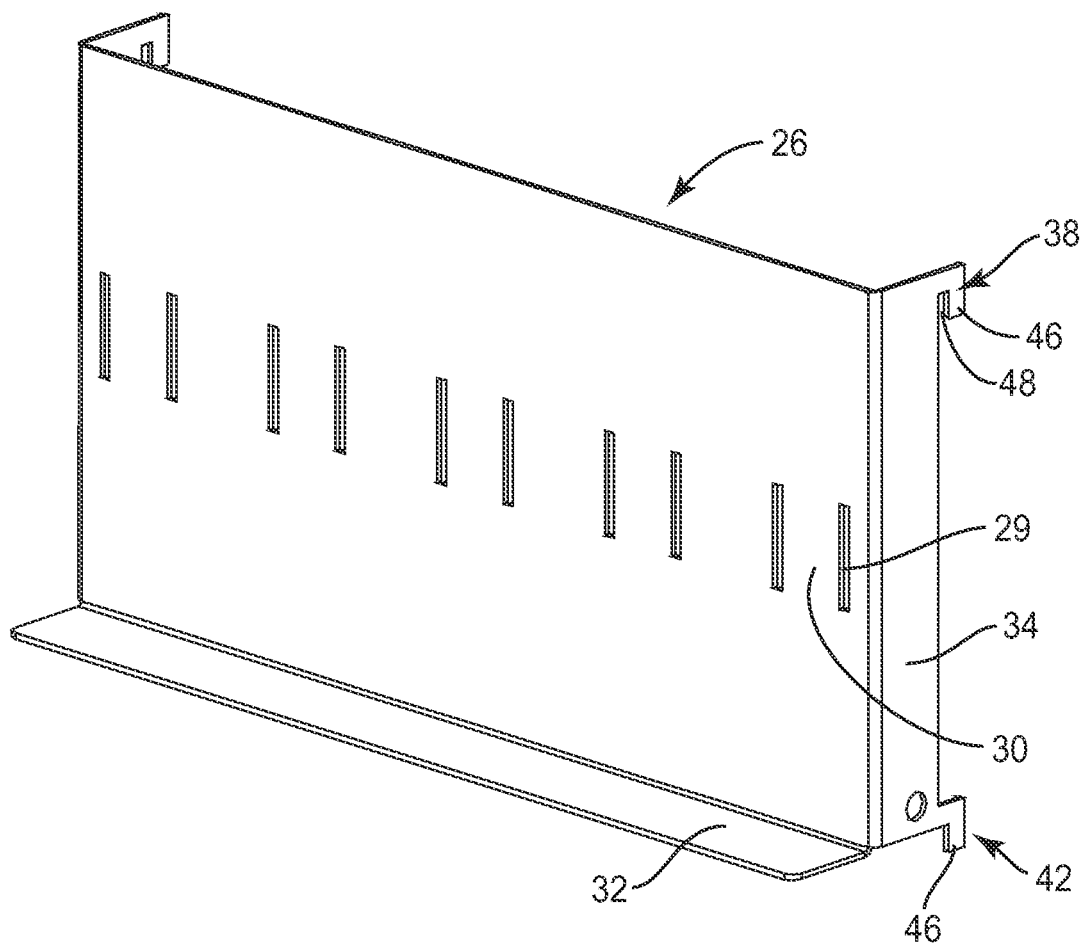
FIG. 5 is an perspective view of the removable electrical transformer attachment panel of FIG. 4.

FIG. 5 shows an electrical transformer attachment panel in greater detail. As shown in FIG. 5, the electrical transformer attachment panel includes a pair of side walls 34 designed to allow the electrical transformer attachment panel to stand a particular distance off a back wall of the rear storage compartment. This provides for air circulation as well as allows for clearance between the back wall of the cart and the rear surface of the electrical transformer attachment panel to accommodate rear tabs 36 of dividers 22. The rear tabs 36 are used to allow the dividers to be held in a vertical position by the rear wall to provide additional stability to the dividers. If the dividers were to be designed differently, the clearance between the rear surface of the electrical transformer attachment panel and the back wall of the rear storage compartment may be adjusted accordingly.

Depending hooks 38, 42, on the side walls of the electrical transformer attachment panel are designed to engage slots 40, 44, in the back wall of the rear storage compartment. In one embodiment, the upper depending hook 38 is sized to have a downwardly extending prong 46 separated from a back edge of the side wall 34 by a gap 48. The width of this gap, in one embodiment, is approximately the width of a thickness of the back wall of the rear storage compartment. Likewise the lower depending hook 42 is designed to have an extending prong that is similarly positioned approximately a thickness of the back wall of the rear storage compartment away from the back edge of the side wall, and extend below the shelf 32.

In operation, depending hooks 38, 42 are inserted into slots 40, 44, and the removable electrical transformer attachment panel 26 is slid downward so that downwardly extending prongs 46 slide behind the back wall of the rear storage compartment. This holds the electrical transformer attachment panel in place relative to the back wall. To remove the electrical transformer attachment panel, the electrical transformer attachment panel is slid up relative to the back wall until the depending hooks no longer engage the back wall. Optionally a set screw or other mechanical fastener (not shown) may be used to secure the electrical transformer attachment panel in place while engaged with the back wall.

Figure 6:
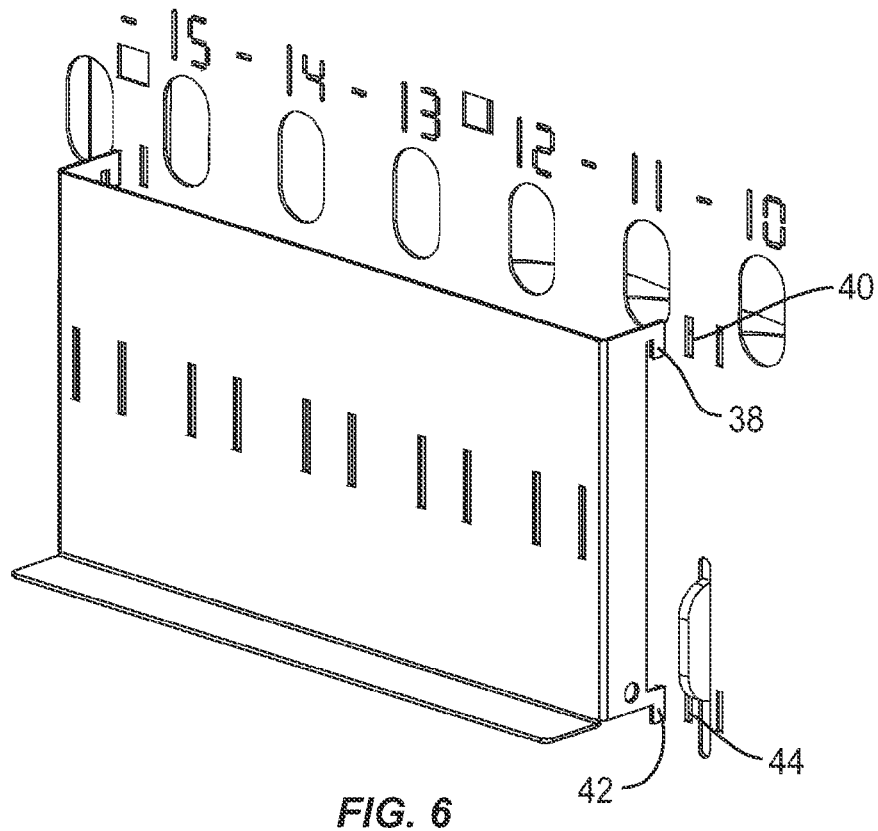
FIGS. 6-7 show sequential steps of inserting the removable electrical transformer attachment panel into the cart of FIG. 1.
Figure 7:
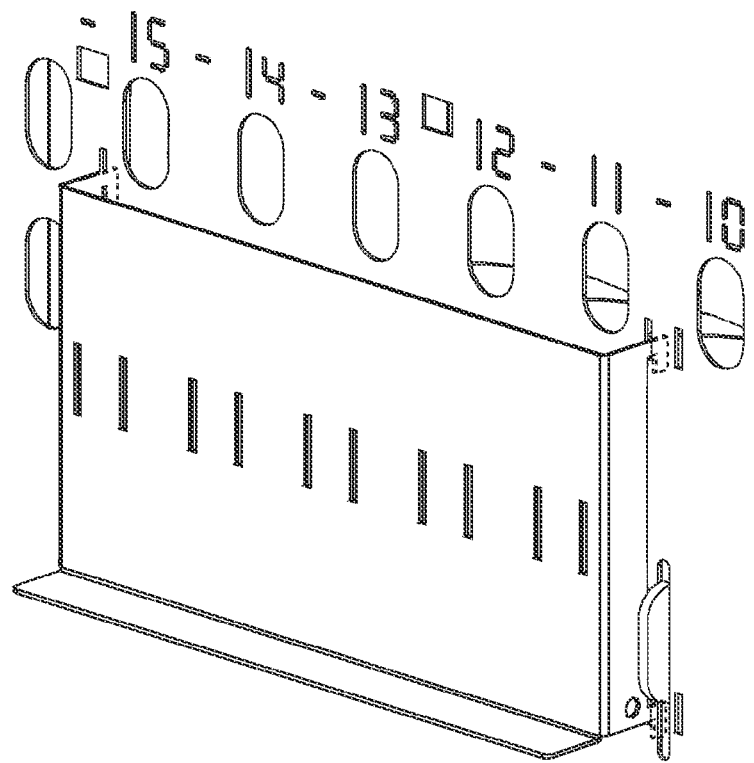
Figure 8:
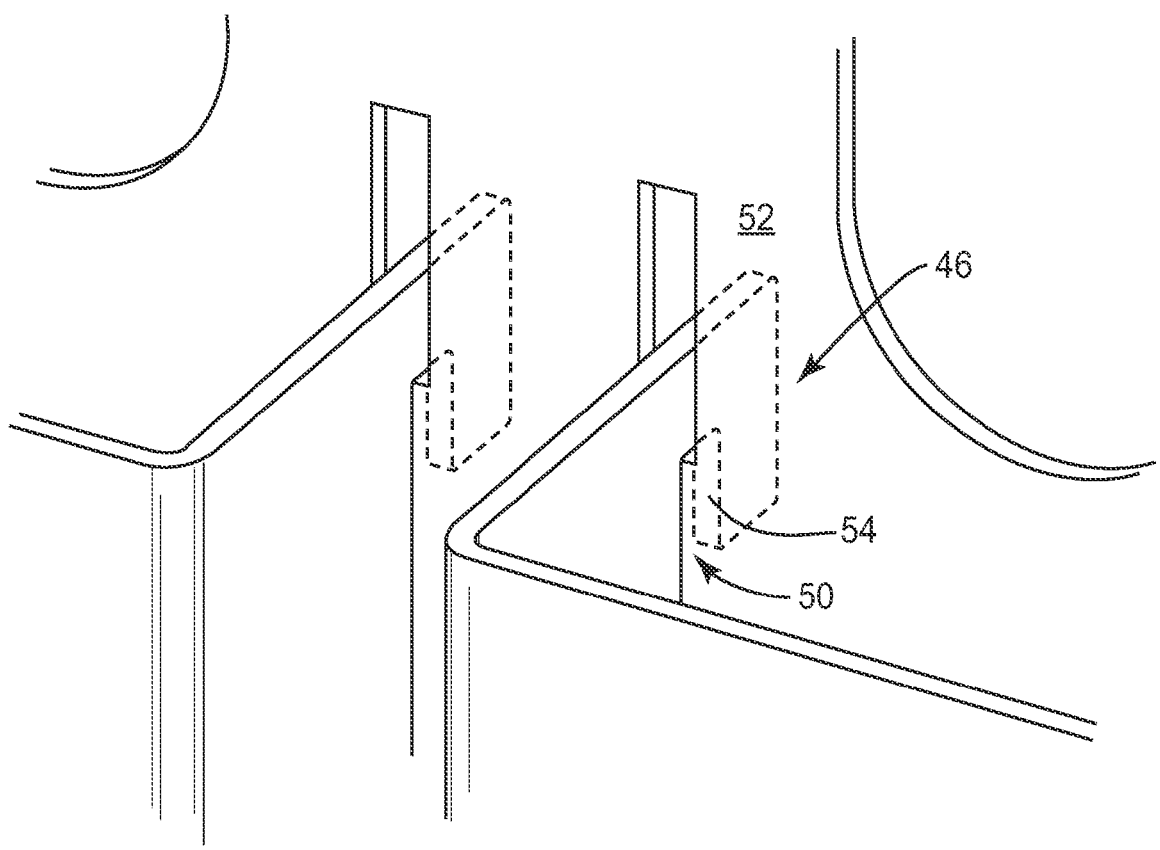
FIG. 8 shows an expanded view of an attachment detail showing the removable electrical transformer attachment panel attached to a back panel of the computer cart.

FIGS. 6-8 show how the electrical transformer attachment panel is secured to the back wall. As shown in FIG. 6, the electrical transformer attachment panel is lined up with the back wall such that depending hooks 38, 42 are aligned with slots 40, 44. The depending hooks are then inserted into the respective slots and the electrical transformer attachment panel is slid down relative to the back wall so that the downwardly extending prongs 46 engage the back surface of the back wall.

Gravity will hold the electrical transformer attachment panel in this position. Optionally, as shown in greater detail in FIG. 8, a frictional fit between the back edge of the side wall 50, the back wall 52, and an inner edge 54 of the downwardly extending prongs 46 may also help hold the electrical transformer attachment panel in place relative to the back wall. A mechanical fastener such as a set screw (not shown) may also be used to hold the electrical transformer attachment panel in place.

Figure 9:
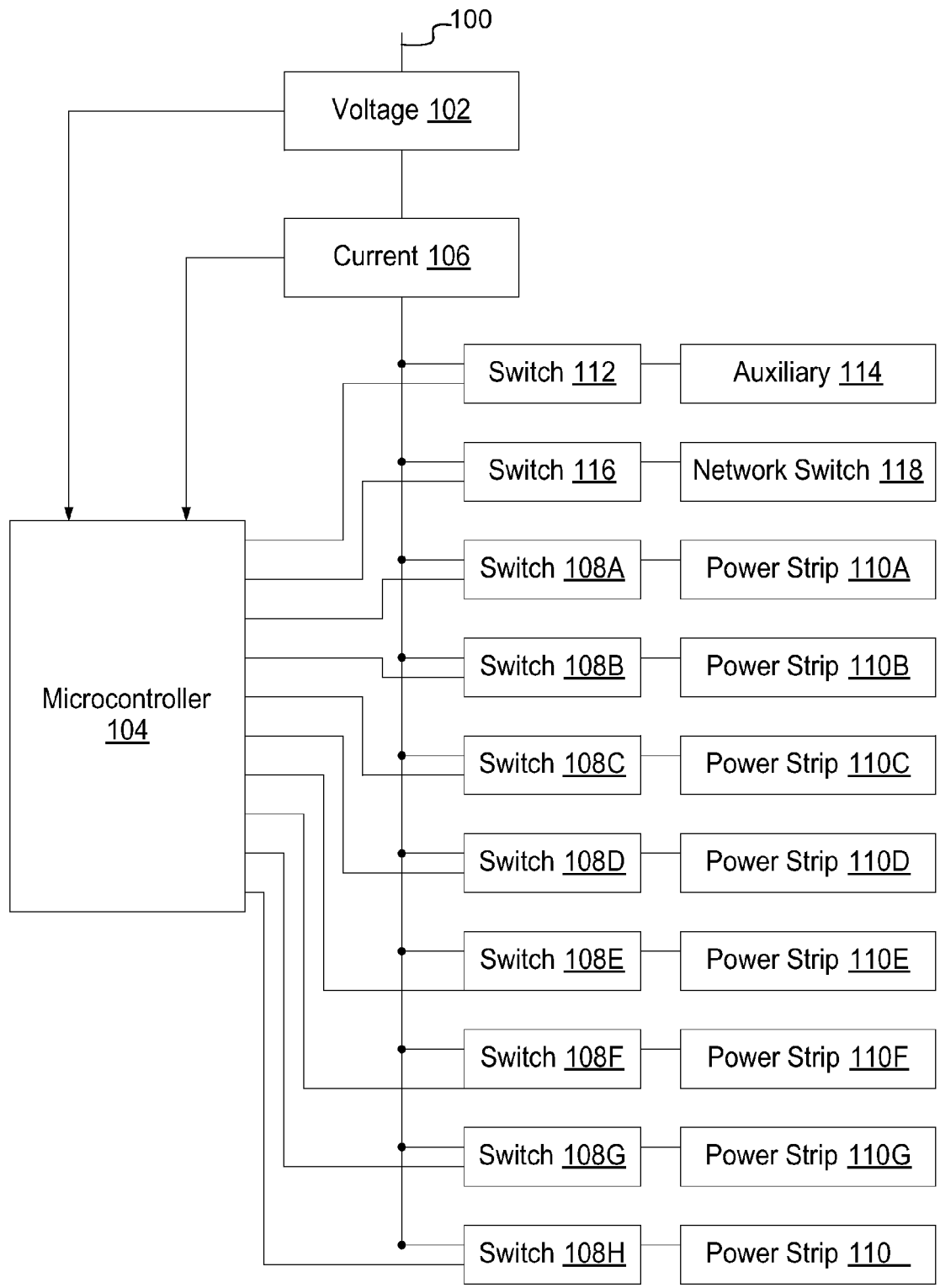
FIG. 9 is a functional block diagram of an electrical power distribution system according to an embodiment.

FIG. 9 shows an embodiment of an electrical system for use in a computer cart such as the cart shown in FIGS. 1-8. As shown in FIG. 9, in one embodiment line power is received on line 100. Optionally an on/off switch may be used to selectively connect the cart to line power, although this option has not been shown in FIG. 9. The voltage on line 100 is sensed by voltage sensor 102 and an indication of the sensed voltage value is transmitted to microcontroller 104. Sensing the voltage value allows the cart to automatically adjust operation characteristics for 110/220 volt line power. For example, if the voltage sensor detects a line voltage above a threshold, such as above 164 volts, the microcontroller may cause the cart charging system to adjust to assume an input voltage of 220 volts, which is a standard line voltage in Europe and numerous other countries. A detected line voltage below this threshold, by contrast, will cause the microcontroller to assume an input voltage of 110 volts, which is the standard line voltage in North America.

The current being drawn by the cart is also sensed by current sensor 106. In one embodiment, the power distribution system is powered from a 15 or 20 amp rated 90-130 VAC circuit or a 10 amp rated 208-264 VAC circuit. The maximum steady state current draw may be limited to 80% of the rated current: 12 amps for a 15 amp circuit, 16 amps for a 20 amp circuit, or 8 amps for a 10 amp circuit. As noted above, the line voltage threshold is used to control operation of the power system. If the current is above the threshold, the microcontroller will assume 220 volt operation and assume the lowest current setting. If the current is below the threshold, the current will be limited at 12 or 15 amps depending on the capacity of the input circuit.

The power management system controls distribution of power within the cart to each zone by switching the zones independently on or off based on the total current draw, as measured by current sensor (amp meter) 106. Specifically, microcontroller 104 controls operation of switches 108A-108H, which individually control distribution of power to power strips 110A-110H. In operation, microcontroller individually controls operation of switches 108A-H to individually control application of power to power strips 110A-H to selectively charge computers plugged into the outlets of the power strips. Referring back to FIG. 3, in one embodiment, each power strip 22 of the embodiment shown in FIG. 3 may correspond to one of the power strips 110A-110H.

To provide power to computers within the cart in an equitable manner, the microcontroller controls distribution of power to the computers in the charging zones in a staggered manner over time, such that each charging zone receives power for at least a portion of the total charging period, while preventing the cart from drawing too much power to overload the circuit associated with line power 100. In the illustrated example there are 8 switches controlling 8 charging zones. Other numbers of switches and charging zones may be controlled as well. The charging zones may be implemented as one or more power strips 22, as shown in FIG. 3, or using other electrical outlets.

The microcontroller controls switch 112 that controls application of power to auxiliary output 114. In one embodiment, power is always applied to the auxiliary output 114 as long as it does not exceed the specified current limit. The auxiliary power output may be used, for example, to allow a computer, television, printer, or other device to obtain power from the computer cart.

Likewise, microcontroller 104 controls switch 116, which controls application of power to network switch 118. The network switch, in one embodiment, is powered off until the total current draw of all outputs is below a specified limit. Network switch 118 may be, for example, a wireless network switch to enable the cart to act as a WiFi (IEEE 802.11) hotspot or, alternatively, may be an Ethernet switch to enable the cart to be connected to a wired network. This allows the computers to be connected to a computer network while stored within the computer cart. Other types of network switches may be used as well to enable the computers contained within the cart to connect with each other and with an external network.

In one embodiment, if the total current draw of all 10 outputs (auxiliary 114, network switch 118, and power strips 110A-H), exceeds the total available current on line 100, the microcontroller will cause the power strips to be turned on in groups of 1 or more for short periods of time, referred to herein as cycles. For example, a charging cycle may be three minutes long. The particular length of the cycle may vary according to the particular implementation. The groupings, in one embodiment, are optimized to power the most outputs possible without exceeding the current limit.

In one embodiment, the microcontroller will cause power to be applied to a first power strip such as power strip 110A, and sense the amount of current drawn by the computers connected to the power strip 110A. If the amount of current drawn by power strip 110A does not exceed the current limit for the given mode of operation, the microcontroller 104 will then cause power to also be applied to a second power strip in a predetermined rotation, such as power strip 110B. This process continues until the current limit is reached. The group of power switches selected in this manner will be charged during the cycle, e.g. for three minutes, and then a new group of outputs will be selected.

When selecting a new group of outputs, the microcontroller will initially select another of the power strips, such as power strip 110B, and cause power to be applied to that power strip. The microcontroller will sense the amount of current drawn by that power strip and, if the total amount of power drawn by the cart does not exceed the current limit for the mode of operation, will activate the next successive power strip 110C. In this manner, the microcontroller uses a staggered round robin approach to select a group of output power strips arranged in a predetermined rotation order to receive power during successive charging cycles.

Table I shows an example selection of charging zones (power strips) during successive cycles. In Table I, the first column (labeled "1 zone/cycle") assumes that the power consumption on a given power strip is sufficiently great to consume all available power in the cart. Hence, during each successive cycle only one of the power strips will receive power. The second column (labeled "2 zones/cycle") shows the selection of power strips in a scenario where two power strips are able to be powered during each cycle. The third and fourth columns (respectively labeled "3 zones/cycle" and "4 zones/cycle") similarly show the selection of power strips where respectively three and four power strips are able to be powered during each cycle:

TABLE I

|  | 1 zone/cycle | 2 zones/cycle | 3 zones/cycle | 4 zones/cycle |
|---|---|---|---|---|
| cycle 1 | 110A | 110A + 110B | 110A + 110B + 110C | 110A + 110B + 110C + 110D |
| cycle 2 | 110B | 110B + 110C | 110B + 110C + 110D | 110B + 110C + 110D + 110E |
| cycle 3 | 110C | 110C + 110D | 110C + 110D + 110E | 110C + 110D + 110E + 110F |
| cycle 4 | 110D | 110D + 110E | 110D + 110E + 110F | 110D + 110E + 110F + 110G |
| cycle 5 | 110E | 110E + 110F | 110E + 110F + 110G | 110E + 110F + 110G + 110H |
| cycle 6 | 110F | 110F + 110G | 110F + 110G + 110H | 110F + 110G + 110H + 110A |
| cycle 7 | 110G | 110G + 110H | 110G + 110H + 110A | 110G + 110H + 110A + 110B |
| cycle 8 | 110H | 110H + 110A | 110H + 110A + 110B | 110H + 110A + 110B + 110C |
| cycle 9 | 110A | 110A + 110B | 110A + 110B + 110C | 110A + 110B + 110C + 110D |

As shown in Table I, if the computers connected to the power strips are drawing a large amount of current, and the microcontroller is only able to charge one power strip at a time, it will cycle through each of the available power strips. As the computers become charged, they will draw less current, thus allowing larger numbers of power strips to be turned on without exceeding the current limit for the computer cart. Thus, for example, when three strips are able to be charged, during cycle 1 the cart will provide power to power strips 110A-C, in cycle 2 the cart will provide power to power strips 110B-D, etc. By starting with a next subsequent strip at each cycle the microcontroller is able to guarantee power to every power strip, while providing power to as many power strips as possible during each charging cycle.

Table I shows application of the staggered round robin approach where all power strips are drawing relatively similar amounts of power. Realistically, it may be expected that there would be instances where some of the power strips will not draw any power, some power strips may draw a considerable amount of power, and other power strips may draw only a little bit of power. These differences in power demand may stem from different numbers of computers being plugged into the different power strips and may also depend on how charged/discharged the computer batteries are. Table II shows an example of application of the staggered round robin approach to distribution of power over a series of cycles assuming the cart is operating at a 12 amp current limit, while assuming the power strips are requiring the following levels of power:

| power strip 110A | 4 Amps |
| power strip 110B | 1 Amps |
| power strip 110C | 3 Amps |
| power strip 110D | 7 Amps |
| power strip 110E | 3 Amps |
| power strip 110F | 0 Amps |
| power strip 110G | 1 Amps |
| power strip 110H | 1 Amps |

TABLE II

|  | combination of power strips active | total current draw |
|---|---|---|
| cycle 1 | 110A + 110B + 110C | 4 + 1 + 3 = 8 |
| cycle 2 | 110B + 110C + 110D | 1 + 3 + 7 = 11 |
| cycle 3 | 110C + 110D | 3 + 7 = 10 |
| cycle 4 | 110D + 110E | 7 + 3 = 10 |
| cycle 5 | 110E + 110F + 110G + 110H + 110A + 110B | 3 + 0 + 1 + 1 + 4 + 1 = 10 |
| cycle 6 | 110F + 110G + 110H + 110A + 110B + 110C | 0 + 1 + 1 + 4 + 1 + 3 = 10 |
| cycle 7 | 110G + 110H + 110A + 110B + 110C | 1 + 1 + 4 + 1 + 3 = 10 |
| cycle 8 | 110H + 110A + 110B + 110C | 1 + 4 + 1 + 3 = 9 |
| cycle 9 | 110A + 110B + 110C | 4 + 1 + 3 = 8 |

As shown in FIG. 2, in operation the number of powered strips will vary depending on the current draw associated with the particular selected strips. The microcontroller will activate one strip, determine the amount of power drawn during steady state by that strip (e.g. after 5 seconds) and if there is sufficient power continue selecting additional strips to receive power until the computer cart current limit has been reached. This will iterate giving each power strip preference (initial selection) until all power strips have been prioritized, at which point the microcontroller will repeat once again selecting the initial power strip as the priority power strip. As all computers within the cart become closer to fully charged, it may be expected that power may be applied to all of the power strips. Specifically, as the computers are charged, the current drawn by the computers will decrease thus allowing the microcontroller to select larger numbers of strips during each charging cycle.

By using a single current meter for the computer cart, the overall current consumed by the cart may be maintained at a level to ensure that the current drawn will not exceed the available line current. Further, by incorporating feedback from this current sensor during the zone selection process, the microcontroller can provide power to an adaptive number of power strips without individually monitoring the amount of current being drawn by any particular power strip. This simplifies the electronic system while continuing to optimize performance of the power system to provide power to optimal groupings of power strips based on the amount of power being drawn by the power strips.

The functions described herein may be implemented as programmable logic used in conjunction with a programmable logic device such as a Field Programmable Gate Array (FPGA) or microprocessor such as microprocessor 104. Alternatively, these functions may be implemented a set of program instructions that are stored in a computer readable memory and executed on one or more processors. Programmable logic can be fixed temporarily or permanently in a tangible medium such as a read-only memory chip, a computer memory, a disk, or other storage medium. All such embodiments are intended to fall within the scope of the present invention.

It should be understood that various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A computer cart, comprising:
    a computer storage compartment; and
    a power distribution system, comprising:
        a current sensor connected to a power input line;
        a microprocessor operably connected to the current sensor for receiving an indication of a sensed current on the power input line, the microprocessor containing programmable logic to cause the microprocessor to activate charging zones on a staggered round robin basis.

2. The computer cart of claim 1, wherein each charging zone comprises a set of outlets.

3. The computer cart of claim 1, wherein each charging zone comprises a power strip having a set of outlets.

4. The computer cart of claim 1, wherein the charging zones are arranged in a predetermined order.

5. The computer cart of claim 1, wherein the charging zones do not include individual current sensors.

6. The computer cart of claim 1, wherein the microprocessor activates charging zones on a staggered round robin basis by:
    selecting a first charging zone;
    determining an amount of current drawn by the cart from the current sensor; and
    when the current drawn by the cart does not exceed a threshold, selecting a second charging zone from the available charging zones, and sequentially selecting additional charging zones according to a predetermined order until the current drawn by the cart approaches the threshold.

7. The computer cart of claim 6, wherein the microprocessor activates charging zones on a staggered round robin basis by:
    charging the selected group of charging zones for a first period of time; and
    selecting a new group of charging zones for a second period of time.

8. The computer cart of claim 7, wherein the new group of charging zones is selected by first selecting the second charging zone.

9. A computer storage system, comprising:
    a computer storage compartment; and
    a power distribution system, comprising:
        a current sensor connected to a power input line;
        a microprocessor operably connected to the current sensor for receiving an indication of a sensed current on the power input line, the microprocessor containing programmable logic to cause the microprocessor to activate charging zones on a staggered round robin basis.

10. The computer storage system of claim 9, wherein each charging zone comprises a set of outlets.

11. The computer storage system of claim 9, wherein each charging zone comprises a power strip having a set of outlets.

12. The computer storage system of claim 9, wherein the charging zones are arranged in a predetermined order.

13. The computer storage system of claim 9, wherein the charging zones do not include individual current sensors.

14. The computer storage system of claim 9, wherein the microprocessor activates charging zones on a staggered round robin basis by:
    selecting a first charging zone;
    determining an amount of current drawn by the cart from the current sensor; and
    when the current drawn by the cart does not exceed a threshold, selecting a second charging zone from the available charging zones, and sequentially selecting additional charging zones according to a predetermined order until the current drawn by the cart approaches the threshold.

15. The computer storage system of claim 14, wherein the microprocessor activates charging zones on a staggered round robin basis by:
    charging the selected group of charging zones for a first period of time; and
    selecting a new group of charging zones for a second period of time.

16. The computer storage system of claim 15, wherein the new group of charging zones is selected by first selecting the second charging zone.

* * * * *